Jan. 20, 1959 S. ALBERT 2,870,324
ELECTRIC WELDING HANDLE
Filed March 15, 1957 3 Sheets-Sheet 1
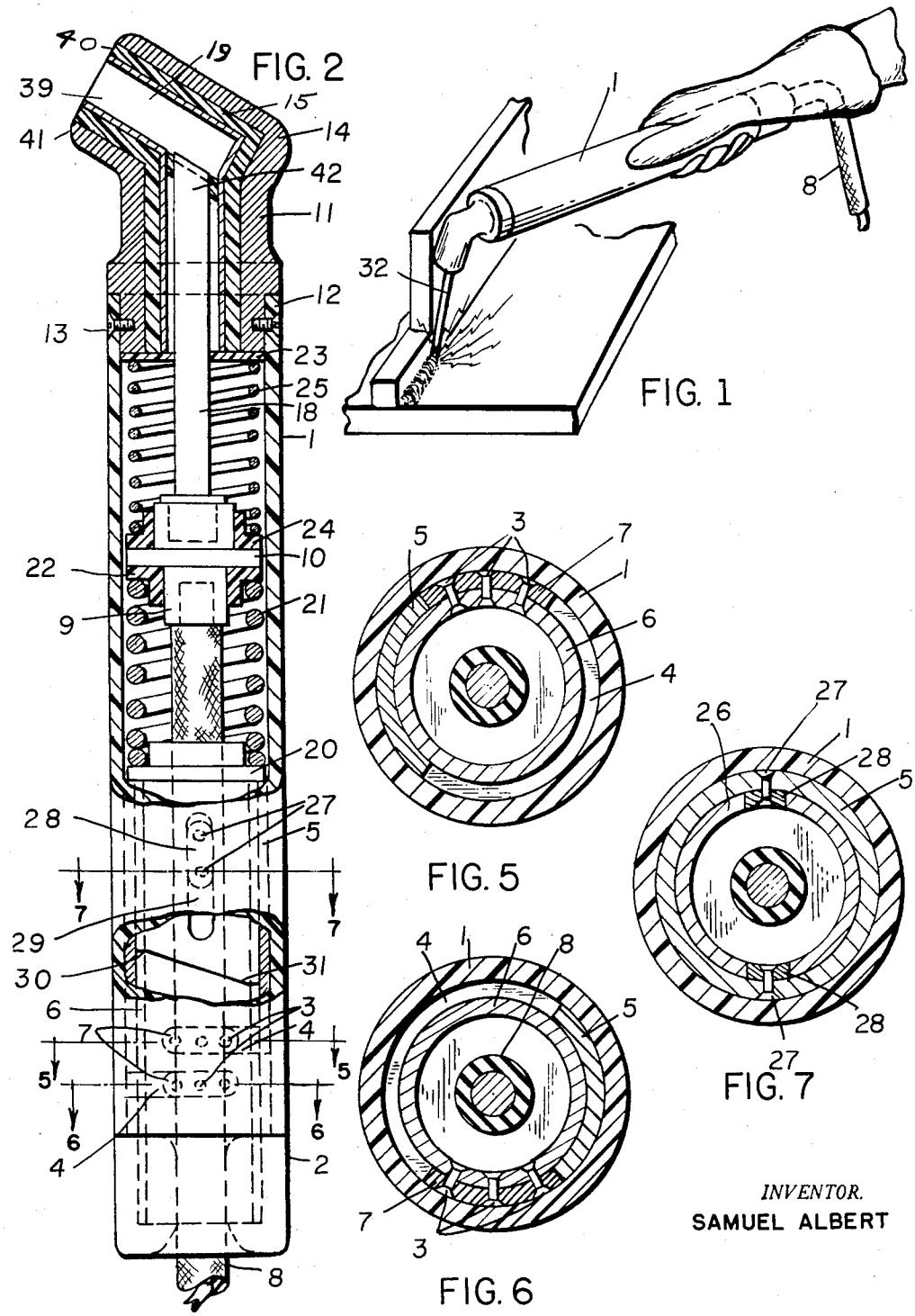
INVENTOR.
SAMUEL ALBERT Jan. 20, 1959        S. ALBERT            2,870,324
              ELECTRIC WELDING HANDLE
Filed March 15, 1957                3 Sheets-Sheet 2
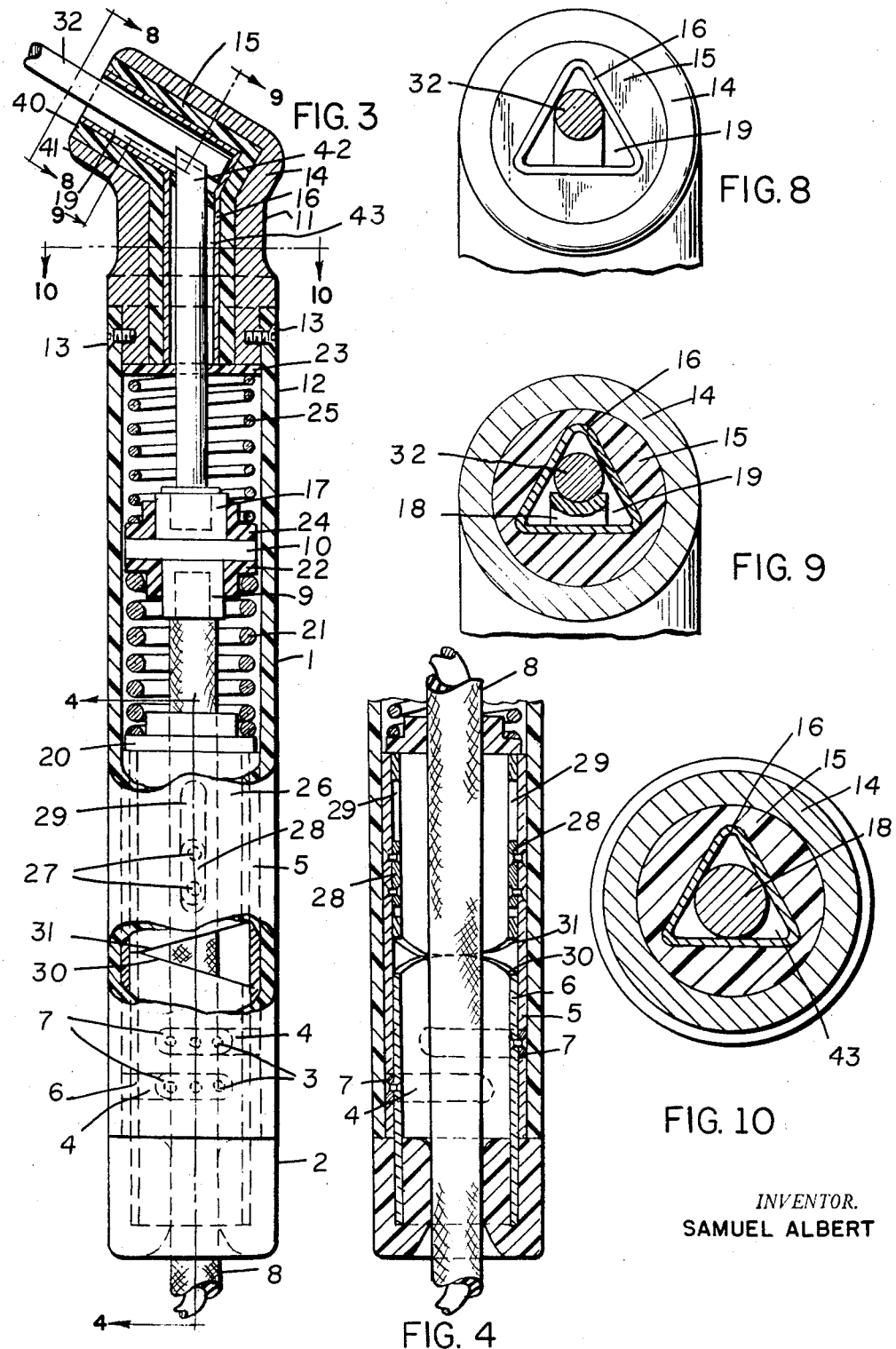
INVENTOR.
SAMUEL ALBERT Jan. 20, 1959  S. ALBERT  2,870,324
ELECTRIC WELDING HANDLE
Filed March 15, 1957  3 Sheets-Sheet 3

*INVENTOR.*
SAMUEL ALBERT

United States Patent Office 2,870,324
Patented Jan. 20, 1959

2,870,324

ELECTRIC WELDING HANDLE

Samuel Albert, Philadelphia, Pa.

Application March 15, 1957, Serial No. 646,410

6 Claims. (Cl. 219—143)

This invention relates to an improved electrode holder used in electric arc welding.

It is an object of my invention to produce an electric welding handle that will provide maximum safety to the user.

Another object of my invention is to produce an electric welding handle that will securely hold the welding rod and provide good electrical contact with the electric cable.

A further object of my invention is to produce an electric welding handle in which the electrode can be quickly, easily and efficiently inserted and removed.

Another object of the invention is to produce an electric welding handle that will not ground when it accidentally touches the metal being welded or on which it is laid down.

A further object of my invention is to produce an electric welding handle which can be moved about without twisting the cable.

A still further object of my invention is to produce an electric welding handle wherein the electric current to the tip is interrupted when the electrode is not locked therein.

Other objects of my invention are to produce an electric welding handle that is light, simple in design, inexpensive to manufacture and having a long life.

Another object of my invention is to produce an electric welding handle whose mechanical operation will not be jammed by pieces of slag falling therein.

Additional objects and advantages of the invention will appear from the following description when taken in connection with the accompanying drawings.

Fig. 1 is an isometric view of the welding handle in use.

Fig. 2 is a side view of the welding handle with parts broken away to show the internal construction.

Fig. 3 is a side view of the welding handle with welding rod clamped into position and with parts of the handle broken away to show its internal construction.

Fig. 4 is a cross-section taken along 4—4 of Fig. 3.

Fig. 5 is a cross-section taken along 5—5 of Fig. 2.

Fig. 6 is a cross-section taken along 6—6 of Fig. 2.

Fig. 7 is a cross-section taken along 7—7 of Fig. 2.

Fig. 8 is a cross-section of the welding rod and view taken along 8—8 in the direction as shown in Fig. 3.

Fig. 9 is a cross-section taken along 9—9 of Fig. 3.

Fig. 10 is a cross-section taken along 10—10 of Fig. 3.

Figure 12:
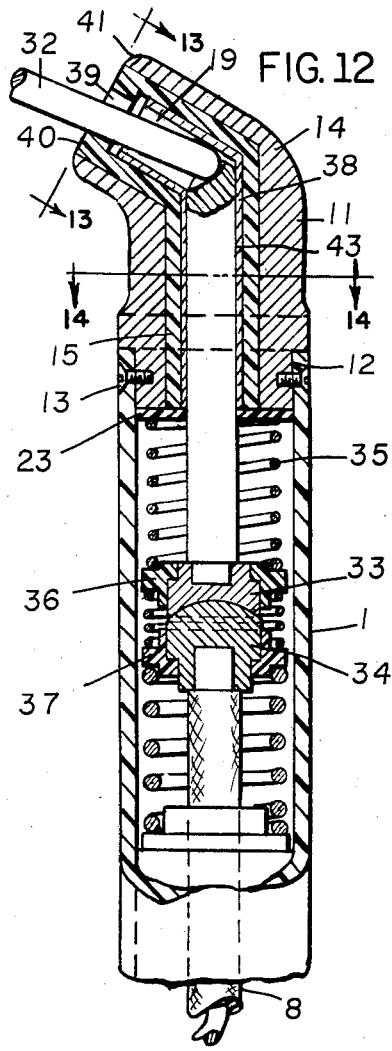
Fig. 12 is a side view of the embodiment of the invention shown in Fig. 11 with welding rod clamped into position and with parts of the handle broken away.

Referring to Figs. 2 and 3, the numeral 1 designates a tubular casing made of rigid non-conducting material such as hard fibre. Base 2 is rotatably mounted on casing 1 by means of rivets 3 fixedly attached to tubular insert 6 fixedly attached to base 2. Rivets 3 are fixedly attached to plates 7 which are slidably mounted in circumferential slots 4 of the inner liner 5 of casing 1, which inner liner is fixedly attached to casing 1.

Longitudinal tubular positioner 26 is longitudinally slidably mounted in casing 1 above tubular insert 6 by means of rivets 27 fixedly attached to inner liner 5 of casing 1. Rivets 27 are fixedly attached to plates 28 which are slidably mounted in longitudinal slots 29.

Slidably mounted in base 2 is electric cable 8. Cable 8 extends through casing 1 and is fastened at its upper end to the lower end 9 of connector 10. Connector 10 is made of a rigid conductor of electricity, such as copper.

Gooseneck 11 is removably attached to the top 12 of casing 1 by means of screws 13. The outer shell 14 of gooseneck 11 is made of a metal such as aluminum and is lined with a rigid non-metallic insulator 15. The outer end of shell 14 is rounded as at 41.

This outer liner 15 is itself lined with inner liner 16, said inner liner 16 being made of a metal such as copper.

Fastened to the top 17 of connector 10 is rod 18, said rod 18 extending into gooseneck 11 and terminating in the intersecting passage 19 of gooseneck 11. Said rod is made of a rigid conductor of electricity such as copper.

The tip 42 of rod 18 can be made detachable so it can be easily replaced when it becomes worn and can be made of a conductor of electricity harder and more wear resistant than rod 18.

Gooseneck passage 43 and intersecting passage 19 are essentially triangular in shape in one embodiment of my invention shown in Figs. 2 and 3. The purpose of this shape is to allow slag or other foreign objects getting into gooseneck passage 43 to fall through and not jam rod 18 in gooseneck passage 43. The space around rod 18 created by such shape also provides a certain amount of air cooling of the handle.

Resting on top of inner liner 5 and tubular positioner 26 is centering bearing ring 20. Above ring 20 is locking spring 21. Above spring 21 is centering support 22, said support 22 bearing against connector 10 from below. Bearing against gooseneck 11 is washer 23 made of a rigid insulating non-metal such as hard fibre. Bearing against connector 10 from above is centering support 24. Between support 24 and washer 23 is throwback or release spring 25.

The adjacent ends 30 and 31 of insert 6 and positioner 26 are convex in relation to each other.

When the handle is in the state shown in Fig. 2, with no electrode locked in place, the electric cable 8 is free to rotate as the handle is turned.

To lock an electrode 32 in place, the electrode is placed in passage 19 of gooseneck 11 and base 2 is turned with relation to casing 1 until the outermost points of ends 30 and 31 are in contact. The effect of this motion is to push longitudinal positioner 26 up through locking spring 21 and against connector 10, forcing rod 18 yieldingly against electrode 32 locking it in passage 19. This action also forms an electric connection between electric cable 8 and electrode 32. Fig. 3 shows the state of the welding handle when the above locking of electrode 32 has been completed.

To remove electrode 32, base 2 is turned back to its original position. Throwback or release spring 25 forces rod 18 back to its original position, and unlocking electrode 32.

The outer metallic shell 14 provides maximum protection against mechanical impact of the gooseneck against hard objects, against sparking and slag deterioration, but because of the insulating outer liner 15 there is no electrical connection between cable 8 and shell 14 and there, therefore, can be no shorting or sparking when the shell touches the metal being welded as shown in Fig. 1 or when the handle is laid down on a metal object.

The radius 41 on the outer end of shell 14 cuts down the collection of slag on outer tip 40 of gooseneck 11. The building up of slag at this point to the extent of joining metallic outer shell 14 and metallic inner liner 16 would create a closed electrical circuit between electric cable 8 and shell 14 causing sparking when shell 14 touches the metal being welded.

In Fig. 12 the part corresponding to connector 10 in Figs. 2 and 3 is divided into two (2) parts 33 and 34. Alternate release spring 35 is wrapped around ring 36, which is fixedly attached to part 33, and bears against ring 37 which is fixedly attached to part 34, thereby keeping parts 33 and 34 apart when there is no greater pressure forcing them together. The effect of this construction is to break the electrical connection between cable 8 and electrode 32 when the electrode 32 is not locked in place. This is an additional precaution when the handle is not in use.

Figure 11:
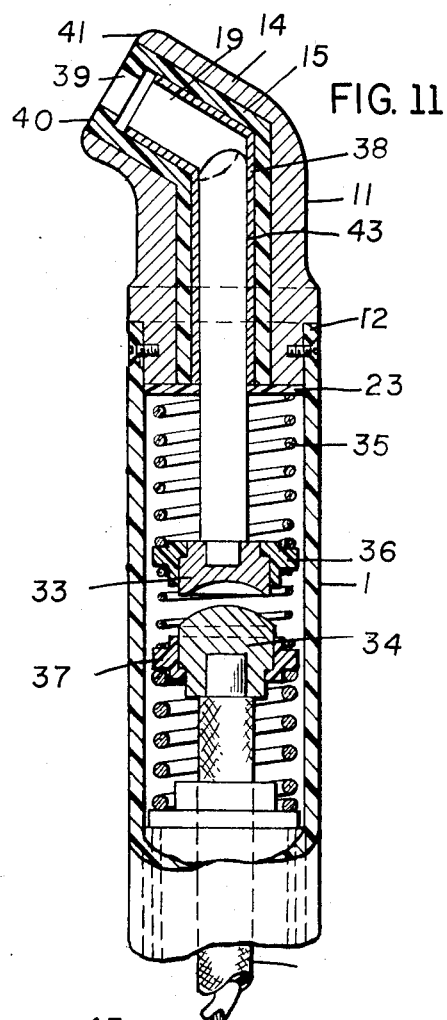
Fig. 11 is a side view of another embodiment of the invention with part broken away and enough internal construction shown to point up the difference in structure.
Figure 13:
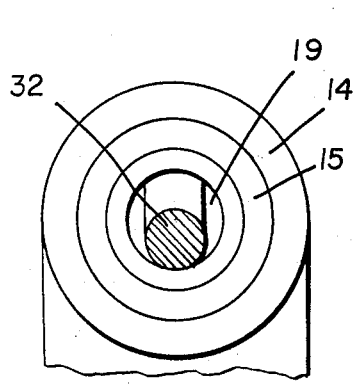
Fig. 13 is a cross-section of the welding rod and view taken along 13—13 in the direction as shown in Fig. 12.
Figure 14:
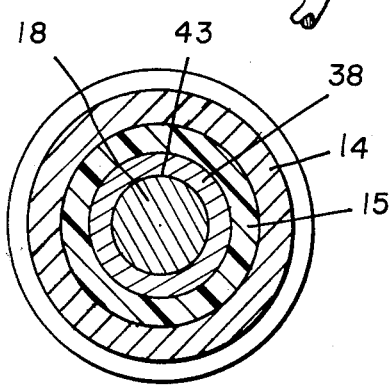
Fig. 14 is a cross-section taken along 14—14 of Fig. 12.

In Figs. 11 and 12, inner liner 38 corresponding to inner liner 16 of Figs. 2 and 3 does not extend to the opening 39 of passage 19 of gooseneck 11. The purpose of this is to prevent an electric connection between metallic inner liner 38 and metallic gooseneck outer shell 14 being established by collection of slag at the outer tip 40 of gooseneck 11. Such an electric connection would close the electrical circuit between cable 8 and metallic gooseneck outer shell 14 causing sparking when shell 14 touches the metal being welded or when the handle is laid down on a metal surface. This break in the potential electrical circuit can also be made by a separation in inner liner 16. This separation can be produced by extending non-conductor outer liner 15 between the two sections.

Various changes and modifications may be made in this electric welding handle, especially in the details of construction, proportion or arrangement of parts within the scope of the following claims.

I claim:

1. In an electric welding handle a tubular casing, a tube movably attached to said casing circumferentially rotatable in relation to said casing, a member movably attached to said casing above said tube longitudinally displaceable in relation to said casing, a cam formed in the top of said tube and the bottom of said member, a spring pressing said member against said tube, a head on top of said casing, said head having formed therein an electrode passage and a longitudinal passage, one end of said longitudinal passage opening into said electrode passage and the other end opening into said tubular casing, a rod on top of said member extending into said longitudinal passage whereby upon the rotation of the tube in relation to said casing the cams coact and longitudinally displace the member in relation to said casing against the pressure of said spring forcing said rod against an electrode end placed in said electrode passage locking said electrode end in place and upon the reverse rotation of the tube in relation to said casing the pressure of said spring forces said member back to its original position, unlocking said electrode end.

2. In an electric welding handle a tubular casing, a tube movably attached to said casing rotatable in relation to said casing, a member movably attached to said casing above said tube longitudinally displaceable in relation to said casing, an arc formed in the top of said tube and the bottom of said member, a disc mounted for longitudinal and rotative movement within said casing, an electric cable mounted within said casing and attached to the bottom of said disc, said disc positioned on top of said member, a head on top of said casing, said head having formed therein an electrode passage and a longitudinal passage one end of said longitudinal passage opening into said electrode passage and the other end opening into said tubular casing, a rod affixed to the top of said disc extending into said longitudinal passage a detachable tip on top of said rod, spring means pressing said disc against said member and said member against said tube whereby upon the rotation of the tube in relation to said casing the cams coact and longitudinally displace the member in relation to said casing against the pressure of said spring forcing said rod against an electrode end placed in said electrode passage locking it in place and upon the reverse rotation of the tube in relation to said casing the pressure of said spring forces said member back to its original position, unlocking said electrode end.

3. In an electric welding handle a tubular casing, a tube movably attached to said casing circumferentially rotatable in relation to said casing, a member movably attached to said casing above said tube longitudinally displaceable in relation to said casing, a cam formed in the top of said tube and the bottom of said member, a head on top of said casing, said head comprising a metal shell having a rounded outer tip, a non-conductor of electricity lining said shell and a metal liner lining said non-conductor forming a triangular electrode passage and a triangular longitudinal passage, one end of said longitudinal passage opening into said electrode passage and the other end opening into said tubular casing, a rod on top of said member extending into said longitudinal passage and spring means pressing said member against said tube whereby upon the rotation of the tube in relation to said casing, the cams coact and longitudinally displace the member in relation to said casing against the pressure of said spring forcing said rod against an electrode end placed in said electrode passage locking said electrode end in place and upon the reverse rotation of the tube in relation to said casing the pressure of said spring forces said member back to its original position, unlocking said electrode end.

4. In an electric welding handle a tubular casing, a tube movably attached to said casing circumferentially rotatable in relation to said casing, a member movably attached to said casing above said tube longitudinally displaceable in relation to said casing, the top of said tube having formed therein a convex arc and the bottom of said member having formed therein a convex arc, a head on top of said casing adapted to receive an electrode, said head comprising a metal shell, a non-conductor of electricity lining said shell and extending out to the tip of the end in which the welding rod is inserted and a metal liner lining said non-conductor to a point in from the tip of the end in which the electrode is inserted, said metal lining forming an electrode passage and a longitudinal passage, one end of said longitudinal passage opening into said electrode passage and the other end opening into said tubular casing, a rod on top of said member extending into said longitudinal passage and spring means pressing said member against said tube whereby upon the rotation of the tube in relation to said casing, the cams coact and longitudinally displace the member in relation to said casing against the pressure of said spring forcing said rod against an electrode end placed in said electrode passage locking said electrode end in place and upon the reverse rotation of the tube in relation to said casing the pressure of said spring forces said member back to its original position, unlocking said electrode end.

5. In an electric welding handle a tubular casing, a tube movably attached to said casing circumferentially rotatable in relation to said casing, a member movably attached to said casing above said tube longitudinally displaceable in relation to said casing, a convex arc formed in the top of said tube and the bottom of said member, an electric cable disposed within the bottom part said casing, a rod disposed within the top part of said casing, a spring pressing said member against said tube, said spring being affixed at its bottom to said cable and at a point above its bottom to said rod, whereby upon the rotation of the tube in relation to said casing the arcs coact and longitudinally displace the member in relation to said casing against the pressure of said spring and bring the cable in contact with the rod against the pressure of said spring and upon the reverse rotation of the tube the pressure of said spring forces said member back to its original position and forces said cable away from said rod.

6. In an electric welding handle a tubular casing, a tube mounted for rotative movement in said casing, a member mounted for longitudinal movement in said casing above said tube, the top of said tube having formed therein a convex arc and the bottom of said member having formed therein a convex arc, a head on top of said casing adapted to receive an electrode, said head comprising a metal shell, a non-conductor of electricity lining said shell and a conductor of electricity lining said non-conductor having a break therein said metal lining forming an electrode passage and a longitudinal passage, one end of said electrode passage and the other end opening into said tubular casing, a rod on top of said member extending into said longitudinal passage and resilient means pressing said member against said tube whereby upon the rotation of the tube in relation to said casing, the cams coact and longitudinally displace the member in relation to said casing against the pressure of said spring forcing said rod against an electrode end placed in said electrode passage locking said electrode end in place and upon the reverse rotation of the tube in relation to said casing the pressure of said spring forces said member back to its original position, unlocking said electrode end.

References Cited in the file of this patent
UNITED STATES PATENTS

| | | |
|---|---|---|
| 1,518,084 | Lovelace | Dec. 2, 1924 |
| 2,293,159 | Miller | Aug. 18, 1942 |
| 2,345,532 | Eriksen | Mar. 28, 1944 |